Patented Mar. 20, 1951

2,545,823

UNITED STATES PATENT OFFICE 2,545,823

QUICK-DRYING WRITING INKS

Raymond L. Mayhew, Phillipsburg, N. J., assignor to General Aniline & Film Corporation, New York, N. Y., a corporation of Delaware No Drawing. Application May 29, 1948, Serial No. 30,210

4 Claims. (Cl. 106—20)

This invention relates to the preparation of greenish-blue writing inks of the quick-drying type.

It is known to prepare brightly colored quick-drying inks by the use of dyestuffs and caustic alkali, the penetrative quality of the caustic alkali causing the ink to be rapidly absorbed by the paper. Up to the present, however, a commercially satisfactory greenish-blue writing ink of this kind has not been produced. This has been due to the instability to caustic alkali of the dyestuffs heretofore employed in the formulation of the inks, the dyestuffs undergoing breakdown during storage to decomposition products which either caused sludge formation in the ink or gave a color thereto radically different in shade from that of the original solution of the dyestuff.

It is an object of the present invention to provide greenish-blue caustic alkali-containing quick-drying writing inks of improved color stability. Further objects will become apparent as the description proceeds.

I have found that the above objects may be accomplished by employing as dyestuffs for quick-drying writing inks of the aforementioned type, certain dilute aqueous caustic alkali-soluble derivatives of copper phthalocyanines of the benzene series.

The term copper phthalocyanines of the benzene series as used herein means tetraazaporphins in which each of the four pyrrole nuclei is fused to a phenylene nucleus and copper is contained in the molecule in complex combination.

The dyestuffs for the quick-drying writing inks of the present invention are copper phthalocyanines of the benzene series containing attached to the phenylene nuclei a plurality of unsubstituted sulfonamide groups. They may be prepared by reacting ammonia, either aqueous or anhydrous liquid, with the corresponding copper phthalocyanine polysulfonylchlorides at room or lower temperatures.

The number of these sulfonamide groups will vary depending on the number of the sulfonylchloride groups on the phenylene nuclei of the starting copper phthalocyanine. In some instances the dyestuffs may contain attached to the phenylene nuclei, in addition to the unsubstituted sulfonamide groups, one or more sulfonic acid groups, either free or in the form of the ammonium salt, or other substituents, such as halogen atoms, e. g., chlorine, or amino or carboxy groups, etc. By introducing a sufficient number of these unsubstituted sulfonamide groups onto the phenylene nuclei, copper phthalocyanine sulfonamides may be obtained which are soluble in dilute aqueous caustic alkali, e. g., sodium, potassium or lithium hydroxide, etc.

The starting copper phthalocyanine polysulfonylchlorides employed in the preparation of the dyestuffs may be obtained by reacting chlorosulfonic acid with the corresponding copper phthalocyanines at an elevated temperature as described in U. S. P. 2,219,330. They may also be made from the corresponding copper phthalocyanine polysulfonic acids or their salts by treatment with phosphorous pentachloride.

The following specific examples are illustrative of the preparation of the dyestuffs. Parts are by weight unless otherwise noted.

Example 1

Fifty parts of copper phthalocyanine tetrasulfonylchloride in the form of a presscake are slowly added with stirring to 50 parts of a saturated aqueous solution of ammonia (previously cooled to 0° C. by means of an ice bath). Care is taken that the temperature of the mixture does not rise above 10° C. during the addition. Stirring is then continued for several hours at 10° C. until dissolution is complete, whereupon the temperature is allowed to rise gradually to room temperature. The resulting solution containing excess ammonia is then evaporated to dryness and the phthalocyanine sulfonamide obtained as a dry powder.

Alternatively, the excess ammonia may be evaporated from the resulting solution and the latter then poured into 100 volumes of a 10% hydrochloric acid solution. The dyestuff precipitated is filtered and dried.

In either case a dark blue powder is obtained which is soluble in dilute aqueous caustic alkali with brilliant greenish-blue coloration.

Example 2

Ten parts of copper phthalocyanine tetrasulfonylchloride is stirred as a dry powder into 50 parts of concentrated ammonia solution and stirring continued for several hours at room temperature until dissolution is complete. The resulting solution of the dyestuff and excess ammonia is then evaporated to dryness. The copper phthalocyanine sulfonamide obtained as a dry powder is similar in characteristics to the corresponding product of Example 1.

Example 3

Fifty parts of copper phthalocyanine tetrasulfonylchloride is slowly stirred into 50 parts of anhydrous liquid ammonia contained in a stainless steel pressure bomb. This mixture is then agitated at room temperature for several hours. The ammonia is then blown off and the product obtained as a dry powder. There is obtained a bright blue dyestuff which is soluble in water and dilute caustic alkali solution.

Example 4

Following the procedure of Example 2, 10 parts of copper phthalocyanine containing chlorine atoms in addition to sulfonylchloride groups was reacted with 50 parts of saturated ammonia solution and worked up to a product similar in character to that of Example 2.

Example 5

Twenty parts of copper phthalocyanine sulfonylchlorides (a mixture containing a substantial proportion of the di- and trisulfonylchloride derivatives) is stirred into 100 parts of a saturated ammonia solution and stirring continued for 12 hours, at room temperature, whereupon the solution is evaporated to dryness. The bright blue powder obtained is somewhat less soluble in dilute aqueous caustic alkali solution than the corresponding dyestuff of Example 1.

Quick-drying inks may be prepared in accordance with the invention by dissolving a small amount of one of the copper phthalocyanine unsubstituted sulfonamides in a dilute aqueous solution of a caustic alkali, e. g., sodium, potassium or lithium hydroxide. Sodium hydroxide generally is to be used because of its lower cost. The concentration of the dyestuff and caustic alkali may be varied depending on the depth of shade and rate of drying desired in the ink. The caustic alkali should be used in concentrations corresponding to those disclosed in U. S. P. 1,932,248 and, described in terms of sodium hydroxide, it should not be below 0.5% and generally may be about 0.8% to about 2½% or slightly more.

Other ingredients found desirable in the art and which do not interfere with the functioning of the dyestuffs may be contained in the inks. As described in the aforesaid U. S. P. 1,932,248, starch may be used for preventing feathering of the ink on the paper, bentonite for improving its flow characteristics and, where required by usage in the trade for greater permanency, alkali soluble metal salts which on exposure to light give colored oxides, e. g., ammonium metavanadate or potassium ferro-cyanide. Small amounts, a fraction of one percent by weight on the ink, of wetting agents resistant to dilute caustic alkali may be used to further speed up the absorption of the ink by the paper. The amount of the wetting agent should not be great enough to cause feathering of the ink which, in each case, can be determined by simple test. A hygroscopic agent, such as sorbitol, glycerol, etc., may be added to the ink to keep the point of the pen moist when exposed to the atmosphere.

A specific formula for the preparation of quick-drying writing inks in accordance with the invention is as follows:

Copper phthalocyanine sulfonamide (product of Example 1, isolated solely by evaporation), three parts
Sodium hydroxide, two parts
Sodium N-oleyl-N-methyltaurate, fraction of one part
Glycerol, one part
Water, 100 parts The above solution represents an attractive greenish-blue writing ink of excellent stability. It is permanent in character and the writing therefrom is still legible after soaking the paper in water for 24 hours.

As various other embodiments of the invention will occur to those skilled in the art, it is not intended that the scope of the patent be limited except as is required by the prior art and the appended claims.

I claim:

1. A quick-drying writing ink comprising in solution a copper phthalocyanine of the benzene series having attached to the phenylene nuclei a plurality of unsubstituted sulfonamide groups, a hygroscopic polyhydric alcohol, water and caustic alkali, the content of caustic alkali in the ink being equivalent to from about one-half to two and one-half percent of sodium hydroxide.

2. A quick-drying writing ink as defined in claim 1, wherein the solution contains a wetting agent.

3. A quick-drying writing ink comprising in solution a copper phthalocyanine of the benzene series having attached to the phenylene nuclei a plurality of unsubstituted sulfonamide groups, a hygroscopic polyhydric alcohol, water and sodium hydroxide, the content of sodium hydroxide in the ink being from about one-half to two and one-half percent.

4. A quick-drying writing ink as defined in claim 3, wherein the solution contains a wetting agent.

RAYMOND L. MAYHEW.

REFERENCES CITED

The following references are of record in the file of this patent:

UNITED STATES PATENTS

| Number | Name | Date |
|---|---|---|
| 2,173,699 | Siegel | Sept. 19, 1939 |
| 2,361,009 | Carman | Oct. 24, 1944 |
| 2,426,194 | Fischbach et al. | Aug. 26, 1947 |

FOREIGN PATENTS

| Number | Country | Date |
|---|---|---|
| 520,199 | Great Britain | Apr. 17, 1940 |

OTHER REFERENCES

Ellis: "Printing Inks," (1940), pages 221 and 280.